United States Patent
Ikehara

(10) Patent No.: US 10,433,391 B2
(45) Date of Patent: Oct. 1, 2019

(54) LIGHTING CONTROL SYSTEM AND LIGHTING CONTROL METHOD

(71) Applicant: Panasonic Intellectual Property Management Co., Ltd., Osaka (JP)

(72) Inventor: Masaaki Ikehara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 45 days.

(21) Appl. No.: 15/819,481

(22) Filed: Nov. 21, 2017

(65) Prior Publication Data

US 2018/0153017 A1    May 31, 2018

(30) Foreign Application Priority Data

Nov. 29, 2016 (JP) .................. 2016-231876

(51) Int. Cl.
  *H05B 33/08* (2006.01)
  *H05B 37/02* (2006.01)
  *G05B 15/02* (2006.01)

(52) U.S. Cl.
  CPC ......... *H05B 33/0863* (2013.01); *G05B 15/02* (2013.01); *H05B 33/0845* (2013.01); *H05B 37/0272* (2013.01); *H05B 37/0281* (2013.01); *G05B 2219/2642* (2013.01); *Y02B 20/42* (2013.01)

(58) Field of Classification Search
  CPC ............ H05B 33/0863; H05B 33/0845; H05B 37/0272; H05B 37/0281; G05B 15/02
  See application file for complete search history.

(56) References Cited

U.S. PATENT DOCUMENTS 4,771,791 A * 9/1988 Kubouchi .......... A61B 10/0012
                                                        374/102
2002/0178448 A1* 11/2002 Te Kiefte ........... H04N 5/44543
                                                        725/46

(Continued)

FOREIGN PATENT DOCUMENTS

JP      2000-241573 A      9/2000
JP      2008307156 A  *  12/2008
(Continued)

*Primary Examiner* — Thomas C Lee
*Assistant Examiner* — Charles Cai
(74) *Attorney, Agent, or Firm* — McDermott Will & Emery LLP

(57) ABSTRACT

A lighting control system includes: a storage which stores a plurality of parameters; a light emitter which emits light in a predetermined mode according to the plurality of parameters; a controller which selects two or more parameters from among the plurality of parameters stored in the storage to generate a group of parameters including the two or more parameters selected; and an obtainer which obtains an instruction from a user. The light emitter emits light at a predetermined time in a mode according to the group of parameters generated by the controller, and when the obtainer obtains a degree of comfort selected from among feeling options each indicating a feeling of the user, the controller generates a new group of parameters by changing, according to the degree of comfort, one or more parameters among the two or more parameters included in the group of parameters.

17 Claims, 18 Drawing Sheets

(56) References Cited

U.S. PATENT DOCUMENTS

2009/0027391 A1* 1/2009 Burley .................... G06T 15/04
345/426
2015/0305126 A1* 10/2015 Maeda ............... H05B 37/0281
315/134

FOREIGN PATENT DOCUMENTS

JP    2013-008490 A    1/2013
JP    2015-207381 A    11/2015

* cited by examiner

FIG. 5

| | PARAMETER | | | | |
|---|---|---|---|---|---|
| INITIAL LIGHT AMOUNT (DIMMING RATE) | 5 % | 25 % | 50 % | 75 % | 100 % |
| LIGHT COLOR | GREEN | LIGHT BULB COLOR | DAYLIGHT WHITE | WHITE | PINK |
| START TIME | 60 MINUTES BEFORE | 45 MINUTES BEFORE | 30 MINUTES BEFORE | 15 MINUTES BEFORE | 5 MINUTES BEFORE |

FIG. 10

| PARAMETER | GROUP OF PARAMETERS A | GROUP OF PARAMETERS B | GROUP OF PARAMETERS C | ... |
|---|---|---|---|---|
| INITIAL LIGHT AMOUNT (DIMMING RATE) | 5 % | 50 % | 50 % | ... |
| LIGHT COLOR | GREEN | DAYLIGHT WHITE | DAYLIGHT WHITE | ... |
| START TIME | 60 MINUTES BEFORE | 15 MINUTES BEFORE | 30 MINUTES BEFORE | ... |
| DEGREE OF COMFORT | UNCOMFORTABLE | COMFORTABLE | COMFORTABLE | ... |

| | PARAMETER | | | | |
|---|---|---|---|---|---|
| INITIAL LIGHT AMOUNT (DIMMING RATE) | 5 % | 5 % | 50 % | 75 % | 100 % |
| LIGHT COLOR | GREEN | LIGHT BULB COLOR | DAYLIGHT WHITE | WHITE | PINK |
| START TIME | 60 MINUTES BEFORE | 45 MINUTES BEFORE | 30 MINUTES BEFORE | 15 MINUTES BEFORE | 5 MINUTES BEFORE |
| MUSIC | ALARM TONE | J-POP | CLASSIC | BIRDSONG | NONE |
| VOLUME | 1 | 2 | 3 | 4 | 5 |
| TEMPERATURE | 20 DEGREES C | 22 DEGREES C | 24 DEGREES C | 26 DEGREES C | NONE |
| IMAGE | NEWS | WEATHER | NATURE | PAINTING | NONE |

FIG. 16

| | INITIAL LIGHT AMOUNT (DIMMING RATE) | LIGHT COLOR | START TIME | MUSIC | VOLUME | TEMPERATURE | IMAGE |
|---|---|---|---|---|---|---|---|
| ... | ... | ... | ... | ... | ... | ... | ... |
| MALE IN HIS 30'S | 50 % | DAYLIGHT WHITE | 30 MINUTES BEFORE | NONE | — | 22 DEGREES C | WEATHER |
| MALE IN HIS 40'S | 75 % | LIGHT BULB COLOR | 15 MINUTES BEFORE | CLASSIC | 5 MINUTES BEFORE | NONE | NATURE |
| ... | ... | ... | ... | ... | ... | ... | ... |

PARAMETER

710

LIGHTING CONTROL SYSTEM AND LIGHTING CONTROL METHOD

CROSS REFERENCE TO RELATED APPLICATION

This application claims the benefit of priority of Japanese Patent Application Number 2016-231876 filed on Nov. 29, 2016, the entire content of which is hereby incorporated by reference.

BACKGROUND

1. Technical Field

The present disclosure relates to a lighting control system and a lighting control method.

2. Description of the Related Art

Lighting apparatuses such as ceiling lights which are attached on a ceiling surface in a room and irradiate the entirety of the room including a wall surface, a floor surface, etc., with light are conventionally used. There is also a lighting system for enabling a user of a lighting apparatus to set environments such as a lighting environment suitable to a time of sleep or a time of wake-up of the user, by using the lighting apparatus (see, for example, Japanese Unexamined Patent Application Publication No. 2015-207381).

SUMMARY

However, the conventional lighting systems lack a mechanism in which a personal difference is taken into consideration, for example, and thus there are cases where some users feel uncomfortable at the time of wake-up. In addition, there are cases where comfortable wake-up and uncomfortable wake-up are experienced by the same user even in the same environment.

The present disclosure provides a lighting control system and the like for performing scene control to provide a user with an environment which the user is likely to find comfortable.

A lighting control system according to an aspect of the present disclosure includes: a storage which stores a plurality of parameters; a light emitter which emits light in a predetermined mode according to the plurality of parameters; a controller which selects two or more parameters from among the plurality of parameters stored in the storage to generate a group of parameters including the two or more parameters selected; and an obtainer which obtains an instruction from a user. In the lighting control system, the light emitter emits light at a predetermined time in a mode according to the group of parameters generated by the controller, and when the obtainer obtains a degree of comfort selected from among feeling options each indicating a feeling of the user, the controller generates a new group of parameters by changing, according to the degree of comfort, one or more parameters among the two or more parameters included in the group of parameters.

In addition, a lighting control method according to an aspect of the present disclosure includes: selecting two or more parameters from among a plurality of parameters to generate a group of parameters including the two or more parameters selected; emitting light at a predetermined time in a mode according to the group of parameters; obtaining a degree of comfort selected from among feeling options each indicating a feeling of a user; and generating a new group of parameters by changing, according to the degree of comfort, one or more parameters among the two or more parameters included in the group of parameters.

In addition, the present disclosure may be implemented as a non-transitory computer-readable recording medium for use in a computer. The recording medium has a computer program recorded thereon for causing the computer to execute the lighting control method.

According to the present disclosure, it is possible to implement a lighting control system and the like to provide a user with an environment which the user is likely to find comfortable.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 5 is a diagram which illustrates an example of a plurality of parameters according to Embodiment 1;

FIG. 10 is a diagram which illustrates an example of a group of parameters selected from among a plurality of parameters;

FIG. 16 is a diagram which illustrates an example of a group of parameters which are stored in association with the attribute information;

DETAILED DESCRIPTION OF THE EMBODIMENTS

Hereinafter, embodiments will be described in detail with reference to the Drawings. Each of the embodiments described below shows a general or specific example. The numerical values, shapes, materials, structural components, the arrangement and connection of the structural components, steps, the processing order of the steps, etc. shown in the following embodiments are mere examples, and therefore do not limit the scope of the appended claims and their equivalents. Furthermore, among the structural components in the following embodiments, structural components not recited in any one of the independent claims are described as arbitrary structural components.

In addition, each diagram is a schematic diagram and not necessarily strictly illustrated. In each of the diagrams, substantially the same structural components are assigned with the same reference signs, and redundant descriptions will be omitted or simplified.

(Embodiment 1)

(Configuration of a Lighting Control System)

Figure 1:
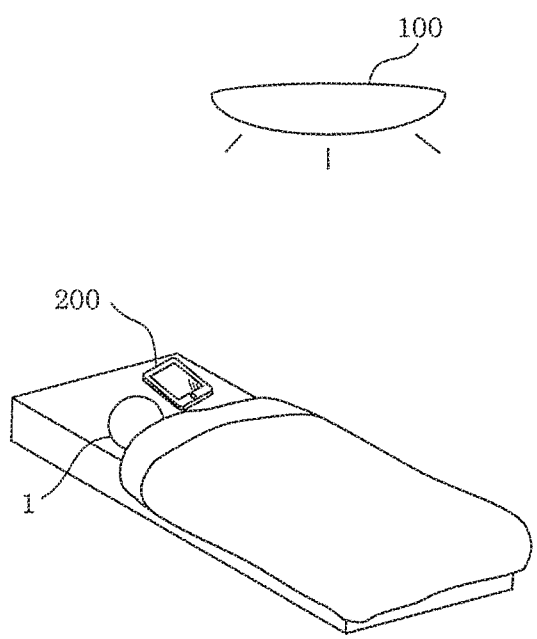
FIG. 1 is a diagram which illustrates a configuration of a lighting control system according to Embodiment 1.
Figure 2:
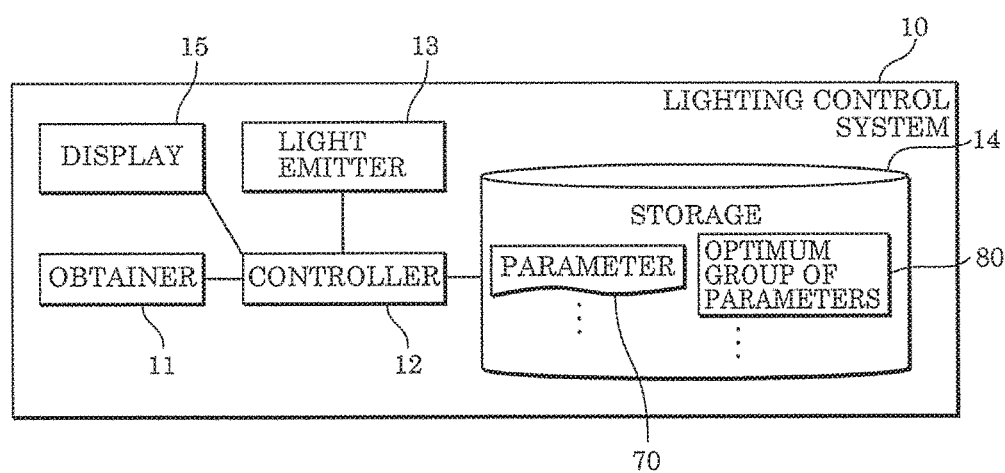
FIG. 2 is a block diagram which illustrates a functional configuration of the lighting system according to Embodiment 1.

First, the following describes in detail a configuration of the lighting control system according to Embodiment 1, with reference to FIG. 1 and FIG. 2. FIG. 1 is a diagram which illustrates a configuration of the lighting control system according to Embodiment 1. FIG. 2 is a block diagram which illustrates a functional configuration of the lighting control system according to Embodiment 1.

As illustrated in FIG. 1, lighting apparatus 100 receives an instruction of user 1 from operation terminal 200 to which lighting apparatus 100 is connected to be capable of communicating with each other by wire or by radio. More specifically, lighting apparatus 100 receives an instruction of user 1 from operation terminal 200 which user 1 operates. Lighting apparatus 100 emits light at a predetermined time in a predetermined mode according to the received instruction. Lighting apparatus 100, for example, obtains time information from user 1 and emits illumination light at a time indicated by the obtained time information in a predetermined mode, thereby performing control (light emission) to implement a predetermined environment in a space (illumination space). The lighting control system according to the present disclosure is a wake-up system for controlling an environment to cause lighting apparatus 100 to emit light in a predetermined mode when user 1 wakes up, for example.

As illustrated in FIG. 2, lighting control system 10 according to Embodiment 1 functionally includes: obtainer 11; controller 12; light emitter 13, storage 14, and display 15.

Obtainer 11 is an input interface for obtaining an instruction provided by user 1. Obtainer 11 is implemented by, for example, a touch panel included in operation terminal 200 connected to lighting apparatus 100 to be capable of communicating with each other, a remote controller capable of obtaining an instruction from user 1 and transmitting the instruction to lighting apparatus 100, or the like.

In addition, obtainer 11 obtains time information indicating when to cause light emitter 13 to emit light in a predetermined mode according to an operation of user 1. Light emitter 13 emits light in the predetermined mode as instructed by controller 12 according to the time information. Here, to emit light in the predetermined mode means to emit light with a particular luminescent color (toning), a particular light intensity (dimming), a particular light distribution, a particular lighting or blinking, etc. In addition, time information may include, for example, when user 1 uses lighting control system 10 at a wake-up time, information indicating a time for waking up, information indicating an occasion such as every day, only weekdays, or only weekends, information indicating a time point of a predetermined day of the week, or information indicating year, month, and day, or time information may be set arbitrarily.

Obtainer 11 obtains, from user 1, a stop instruction for causing scene control to stop. The scene control is emitting light by light emitter 13 in a predetermined mode. When obtainer 11 obtains the stop instruction, light emitter 13 stops emitting light in a predetermined mode (scene control).

In addition, obtainer 11 obtains, from user 1, a degree of comfort regarding an environment when light emitter 13 emits light in a predetermined mode. The degree of comfort is selected from among a plurality of feeling options each indicating a feeling of comfort or discomfort. Details of the feeling options will be given later.

It should be noted that, when obtainer 11 obtains the above-described degree of comfort, light emitter 13 may stop emitting light in a predetermined mode (i.e., scene control).

Controller 12 is a processing unit which generates a group of parameters according to the instruction of user 1 obtained by obtainer 11. Controller 12 is, for example, a processor implemented by a central processing unit (CPU) and a control program stored in storage 14. In addition, controller 12 may have a clock function such as a real time clock (RTC).

Controller 12 selects two or more parameters from among a plurality of parameters 70 stored in storage 14. More specifically, controller 12 selects two or more parameters 70 stored in storage 14 and generates a group of parameters for enabling light emitter 13 to perform scene control.

In addition, when obtainer 11 obtains a degree of comfort selected from among feeling options each of which indicates a feeling of user 1, controller 12 changes, according to the degree of comfort, parameters included in the group of parameters. Specifically, controller 12 changes a parameter such that a group of parameters newly generated after obtainer 11 obtains the above-described degree of comfort from user 1 includes at least one parameter that is different from the parameters included in the group of parameters before the degree of comfort is obtained. More specifically, controller 12 generates a new group of parameters by changing at least one parameter among the parameters included in the group of parameters, according to the degree of comfort selected from among the feeling options and obtained by obtainer 11. Here, the feeling options include an option indicating a feeling of comfort of user 1 (a positive feeling) and an option indicating a feeling of discomfort of user 1 (a negative feeling).

Controller 12 changes a parameter (the group of parameters) such that the number of parameters changed when controller 12 generates a new group of parameters is smaller when user 1 selects the option indicating a feeling of comfort of user 1 (first option) than when user 1 selects the option indicating a feeling of discomfort of user 1 (second option). Controller 12 generates a new group of parameters by performing such a parameter change.

Accordingly, lighting control system 10 according to the present disclosure obtains, from user 1, a degree of comfort indicating whether or not the environment implemented by light emitter 13 is comfortable, and changes, according to the degree of comfort obtained from user 1, a group of parameters used for implementing the environment, thereby implementing an environment that is comfortable for user 1.

In addition, when user 1 selects a positive feeling regarding an environment, controller 12 causes storage 14 to store a group of parameters for implementing the environment as optimum group of parameters 80.

In addition, in the case where controller 12 generates a new group of parameters when a predetermined number of optimum groups of parameters 80 are stored in storage 14, controller 12 selects a group of parameters from among the predetermined number of optimum groups of parameters 80 stored in storage 14, and determines the selected group of parameters as a new group of parameters. In other words, controller 12 causes storage 14 to store a group of parameters for implementing an environment which user 1 finds comfortable. Then, when a predetermined number of optimum groups of parameters are stored in storage 14, controller 12 selects a group of parameters from among the optimum groups of parameters.

In addition, when user 1 selects a negative feeling regarding an environment, controller 12 performs control for preventing storage 14 from storing a group of parameters for implementing the environment as optimum group of parameters. For example, when a group of parameters defining an environment for which user 1 selects a negative option is stored in storage 14 as one of optimum groups of parameters, controller 12 causes the group of parameters defining the environment in storage 14 to be deleted from the optimum groups of parameters.

It should be noted that, although it has been described that controller 12 is implemented by software as a result of a CPU executing a control program, implementation of controller 12 is not limited to this method, and may be implemented by hardware with a dedicated electron circuit using a gate array or the like.

Light emitter 13 is a lighting device which emits illumination light in a predetermined mode according to the group parameters which controller 12 generates or selects from groups of parameters stored in storage 14. Light emitter 13 is implemented by a light source such as a light emitting diode (LED). Light emitter 13 is capable of performing dimming, for example, and the amount of illumination light to be emitted is adjusted by controller 12. In addition, light emitter 13 is capable of emitting light of a plurality of luminescent colors. Light emitter 13 includes, for example, a red LED which emits red light, a green LED which emits green light, and a blue LED which emits blue light. According to this configuration, controller 12 changes the amount of emission light of the red LED, the green LED, and the blue LED, thereby allowing light emitter 13 to emit light of an intended luminescent color. In addition, light emitter 13 may include a white LED including the blue LED and a yellow phosphor which emits yellow light by receiving a portion of blue light emitted by the blue LED. Furthermore, light emitter 13 may include, for example, an LED which emits light of a light bulb color having a color temperature of approximately 3000 K (Kelvin), an LED which emits white light having a color temperature of approximately 4200 K and an LED which emits light of daylight white having a color temperature of approximately 5000 K. In other words, light emitter 13 may include light sources each of which emits light of a different color temperature (and color deviation). Storage 14 stores, as parameters 70, a luminescent color, an amount of emission light, lighting or blinking, a timing for emitting light, etc., of the above-described LED or the like included in light emitter 13. Controller 12 selects a plurality of parameters from among parameters 70 stored in storage 14, and generates a group of parameters. Light emitter 13 emits light in a mode according to the group of parameters. In other words, light emitter 13 performs scene control according to the group of parameters.

Light emitter 13 stops emitting light when obtainer 11 obtains, from user 1, a stop instruction for stopping emitting of light. In other words, light emitter 13 stops performing of the scene control when obtainer 11 obtains the stop instruction for stopping emitting of light from user 1. At this time, light emitter 13 may stop emitting light or may emit light in a predetermined mode.

Storage 14 is a storage device in which parameters 70 each of which defines a mode of emitting light by light emitter 13; that is, a mode for performing scene control, are stored. Storage 14 also stores a control program to be executed by controller 12. Storage 14 is implemented by, for example, a read only memory (ROM), a random access memory (RAM), a hard disk drive (HDD), a flash memory, etc.

Display 15 is a display device for displaying an image for obtaining an instruction of user 1, as a result of being controlled by controller 12. Display 15 is, for example, a liquid-crystal monitor, etc.

It should be noted that the above-described obtainer 11, controller 12, storage 14, and display 15 may be included by one of lighting apparatus 100 and operation terminal 200 illustrated in FIG. 1. For example, lighting apparatus 100 may include a touch panel or the like which includes obtainer 11 for obtaining an instruction from user 1. In addition, storage 14, for example, may be included by either one of lighting apparatus 100 and operation terminal 200, may be included by each of lighting apparatus 100 and operation terminal 200, or may be included by lighting control system 10 as a storage device separately from lighting apparatus 100 or operation terminal 200. When storage 14 is included by lighting control system 10 as a storage device separately from lighting apparatus 100 or operation terminal 200, storage 14 may be connected to lighting apparatus 100 and operation terminal 200 in such a manner that communication is allowed with one another.

Light emitter 13 emits light in a mode according to the group of parameters generated by controller 12. Here, light emitter 13 may operate so as to obtain the group of parameters, or controller 12 may instruct light emitter 13 to emit light in a predetermined mode according to the group of parameters. More specifically, controller 12 may generate a group of parameters, and cause light emitter 13 to emit light in a predetermined mode according to the group of parameters. In other words, controller 12 may perform the scene control.

(Processing Procedure of the Lighting Control System)

The following describes a processing procedure of scene control executed by the lighting control system according to Embodiment 1. Lighting control system 10 according to the present disclosure is a lighting control system which performs scene control at a time intended by user 1. Accordingly, although lighting control system 10 according to the present disclosure may be used at an arbitrary time, the following describes the case where light emitter 13 emits light by receiving an operation of user 1 such that a predetermined environment is implemented at a wake-up time.

A processing procedure of lighting control system 10 when user 1 starts to use lighting control system 10 will be described with reference to FIG. 3 to FIG. 6.

Figure 3:
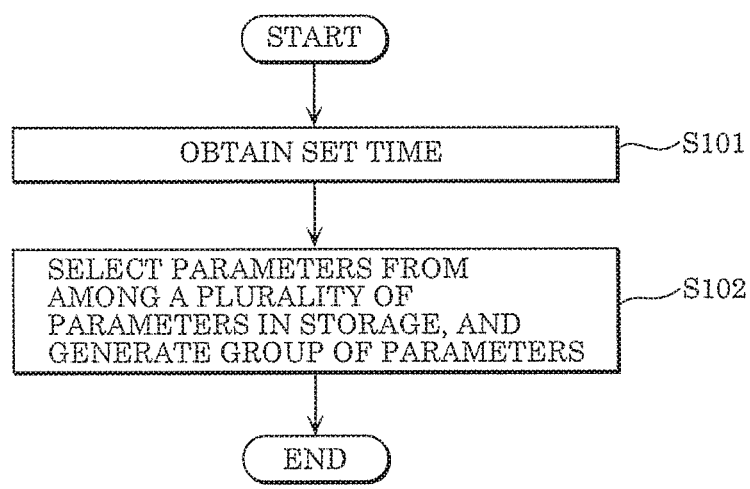
FIG. 3 is a flowchart which illustrates a processing procedure at the time of initial settings of the lighting control system according to Embodiment 1.
Figure 4:
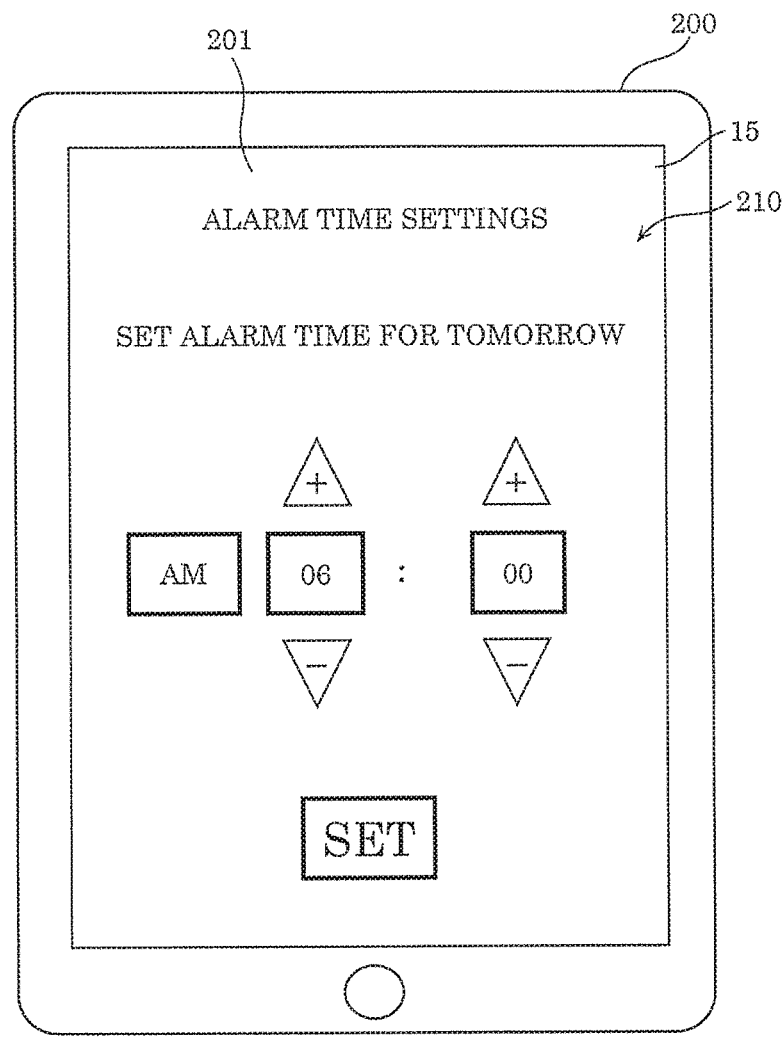
FIG. 4 is a diagram which illustrates an example of an image that is displayed at the time of time settings of the lighting control system according to Embodiment 1.

FIG. 3 is a flowchart which illustrates a processing procedure at the time of initial settings of lighting control system 10 according to Embodiment 1. FIG. 4 is a diagram which illustrates an example of time settings image that is displayed at the time of time settings of lighting control system 10 according to Embodiment 1.

As illustrated in FIG. 3, obtainer 11 obtains, from user 1, time information indicating a time at which light emitter 13 performs scene control (Step S101). More specifically, for example, controller 12 causes touch panel display 201 (an example of display 15) included by operation terminal 200 to display time settings image 210, as illustrated in FIG. 4. User 1 operates touch panel display 201, thereby setting a time at which light emitter 13 performs scene control. It should be noted that, in Embodiment 1, the case where user 1 sets a set time to 6:00 AM of the next day is described.

Next, controller 12 arbitrarily selects parameters from among a plurality of parameters 70 stored in advance in storage 14, and generates a group of parameters (Step S102).

FIG. 5 is a diagram which illustrates an example of a plurality of parameters according to Embodiment 1. For example, controller 12 selects a plurality of parameters from among the parameters illustrated in FIG. 5, and generates a group of parameters.

Figure 6:
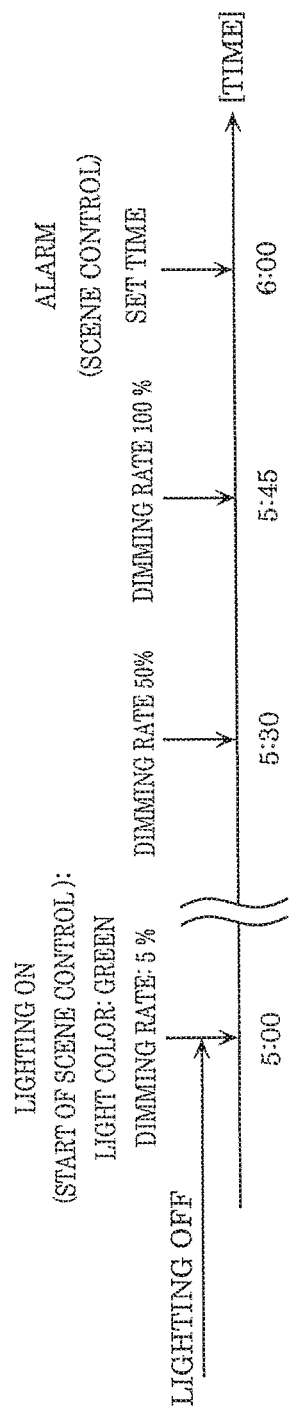
FIG. 6 is a diagram which illustrates an example of an operation when the lighting control system according to Embodiment 1 causes a light emitter to emit light in a predetermined mode.

FIG. 6 is a diagram which illustrates an example of an operation performed when the lighting control system according to Embodiment 1 causes the light emitter to emit light in a predetermined mode. More specifically, FIG. 6 is a diagram which illustrates an example of an operation performed by light emitter 13 when controller 12 selects, from among the parameters illustrated in FIG. 5, three parameters indicating: 5% as an initial light amount (dimming rate); green as a light color; and 60 minutes before as a start time, and generates a group of parameters.

As illustrated in FIG. 6, light emitter 13 performs scene control at 5:00 AM that is 60 minutes before the set time of 6:00 AM obtained from user 1. More specifically, according to the group of parameters generated by controller 12, light emitter 13 emits green light at 5:00 AM with the initial light amount (dimming rate) being 5%.

It should be noted that, as illustrated in FIG. 6, controller 12 may cause the dimming rate to change with time, with the dimming rate being 50% at 5:30 AM and 100% at 5:45 AM, for the scene control to be performed by light emitter 13.

The following describes a processing procedure in which lighting control system 10 obtains an instruction from user 1 and changes the group of parameters for implementing an environment, with reference to FIG. 7 to FIG. 10.

Figure 7:
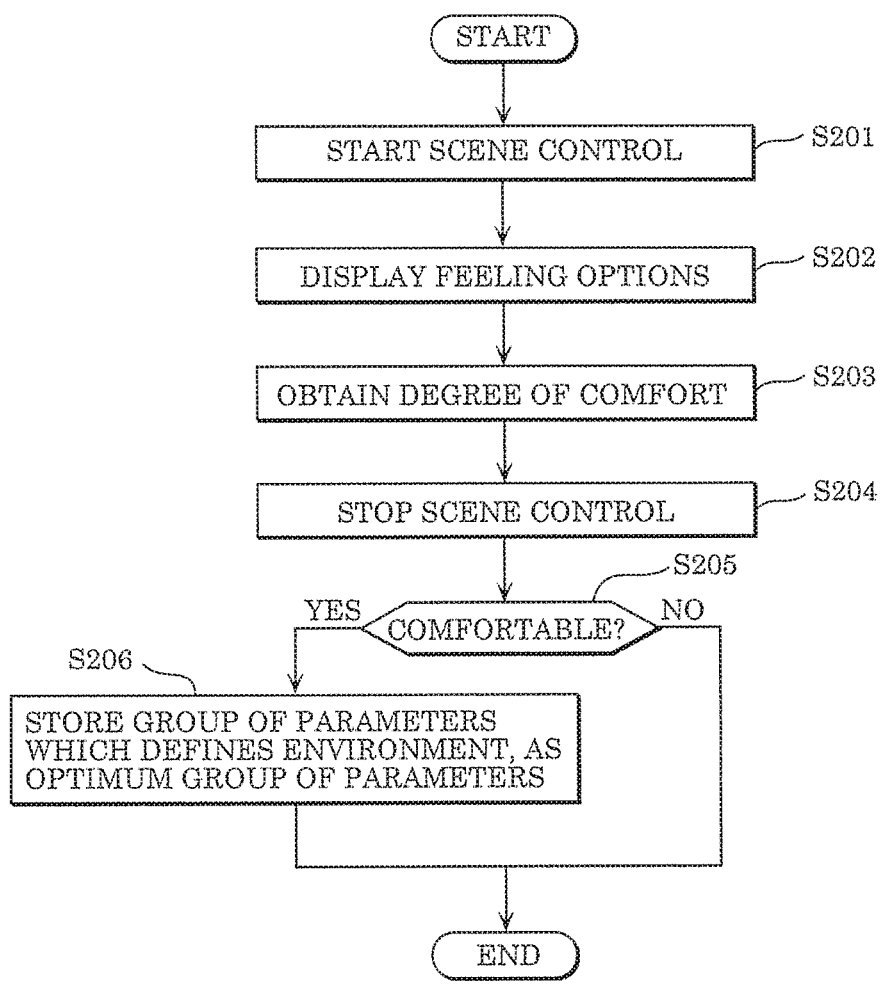
FIG. 7 is a flowchart which illustrates a processing procedure at the time of obtaining an evaluation on an environment from a user of the lighting control system according to Embodiment 1.

FIG. 7 is a flowchart which illustrates a processing procedure of lighting control system 10 according to Embodiment 1, at the time of obtaining an evaluation on the environment from user 1.

As illustrated in FIG. 7, light emitter 13 performs scene control so as to emit light at a time according to time information obtained from user 1 in a mode according to a group of parameters generated by controller 12 (Step S201).

Next, controller 12 performs control for causing display 15 to display selection image 220 including feeling options 223 for causing user 1 to select whether or not the environment is comfortable (Step S202). Obtainer 11 obtains, from user 1, a degree of comfort which indicates whether or not the environment is comfortable (Step S203).

Figure 8A:
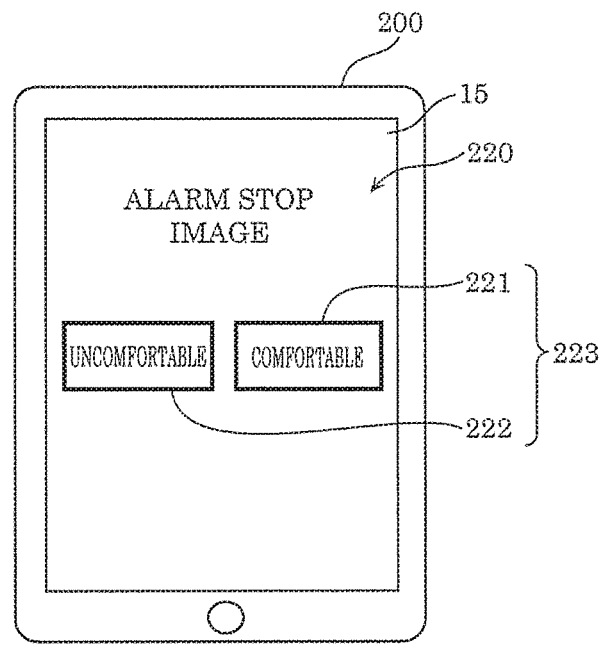
FIG. 8A is a diagram which illustrates an example of a selection image that is displayed at the time of obtaining an evaluation of the user of the lighting control system according to Embodiment 1.

FIG. 8A is a diagram which illustrates an example of a selection image that is displayed at the time of obtaining an evaluation of user 1 of lighting control system 10 according to Embodiment 1.

As illustrated in FIG. 8A, selection image 220 including first option 221 which illustrates a positive feeling and second option 222 which illustrates a negative feeling is displayed on display 15. User 1 selects first option 221 when the environment is comfortable and selects second option 222 when the environment is uncomfortable. It should be noted that the selection image for causing user 1 to select (instruct) a feeling of whether or not the environment is comfortable is not limited to this example.

Figure 8B:
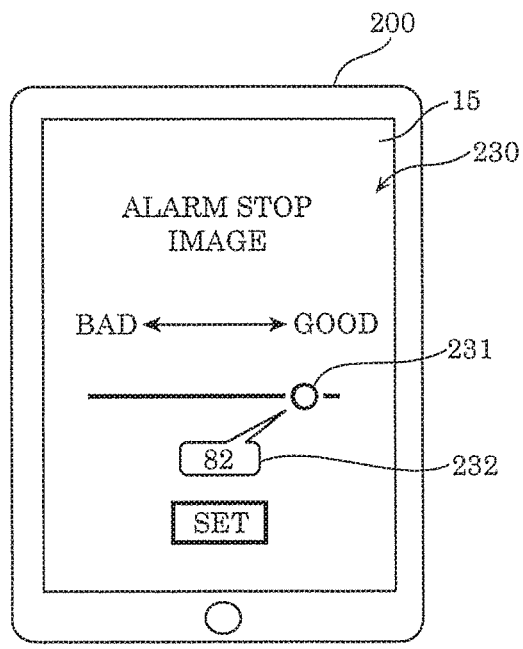
FIG. 8B is a diagram which illustrates another example of a selection image that is displayed at the time of obtaining an evaluation of the user of the lighting control system according to Embodiment 1.

FIG. 8B is a diagram which illustrates another example of a selection image that is displayed at the time of obtaining an evaluation of user 1 of lighting control system 10 according to Embodiment 1.

As illustrated in FIG. 8B, an instruction for obtaining the evaluation of user 1 indicating whether or not the environment is comfortable may be indicated, for example, by degree of comfort score 232 that is a numerical value obtained by operating feeling options 231 as indicated in selection image 230. In this case, for example, user 1 may give an instruction by raising degree of comfort score 232 when user 1 finds the environment comfortable. For example, controller 12 may set a predetermined threshold for degree of comfort score 232, and determine that user 1 finds the environment comfortable when degree of comfort score 232 is greater than or equal to the threshold. More specifically, when degree of comfort score 232 is greater than or equal to the threshold, controller 12 may determine that first option 221 which indicates a positive feeling of user 1 illustrated in FIG. 8A is selected. In addition, when degree of comfort score 232 is less than the threshold, controller 12 may determine that second option 222 which indicates a negative feeling of user 1 illustrated in FIG. 8A is selected.

Light emitter 13 stops performing of the scene control when obtainer 11 obtains the degree of comfort from user 1 (Step S204). More specifically, when obtainer 11 obtains the degree of comfort from user 1, light emitter 13 stops emitting light in a predetermined mode according to the group of parameters.

It should be noted that an option for allowing light emitter 13 to obtain, from user 1, a stop instruction for stopping the scene control may be included, or light emitter 13 may stop performing of the scene control when user 1 selects first option 221 or second option 222.

Next, controller 12 determines whether or not the environment is comfortable for user 1 (a positive feeling) (Step S205).

When the degree of comfort obtained by obtainer 11 indicates that the environment is comfortable for user 1 (Yes in Step S205), controller 12 causes storage 14 to store the group of parameters which defines the environment as an optimum group of parameters (Step S206). More specifically, when user 1 selects first option 221, controller 12 causes storage 14 to store the group of parameters which defines the environment as the optimum group of parameters. On the other hand, when the degree of comfort obtained by obtainer 11 indicates that the environment is uncomfortable (not comfortable) for user 1 (No in Step S205), controller 12 ends the processing without causing storage 14 to store the group of parameters which defines the environment.

The following describes a processing procedure at the time when controller 12 changes the parameter for defining an environment.

Figure 9:
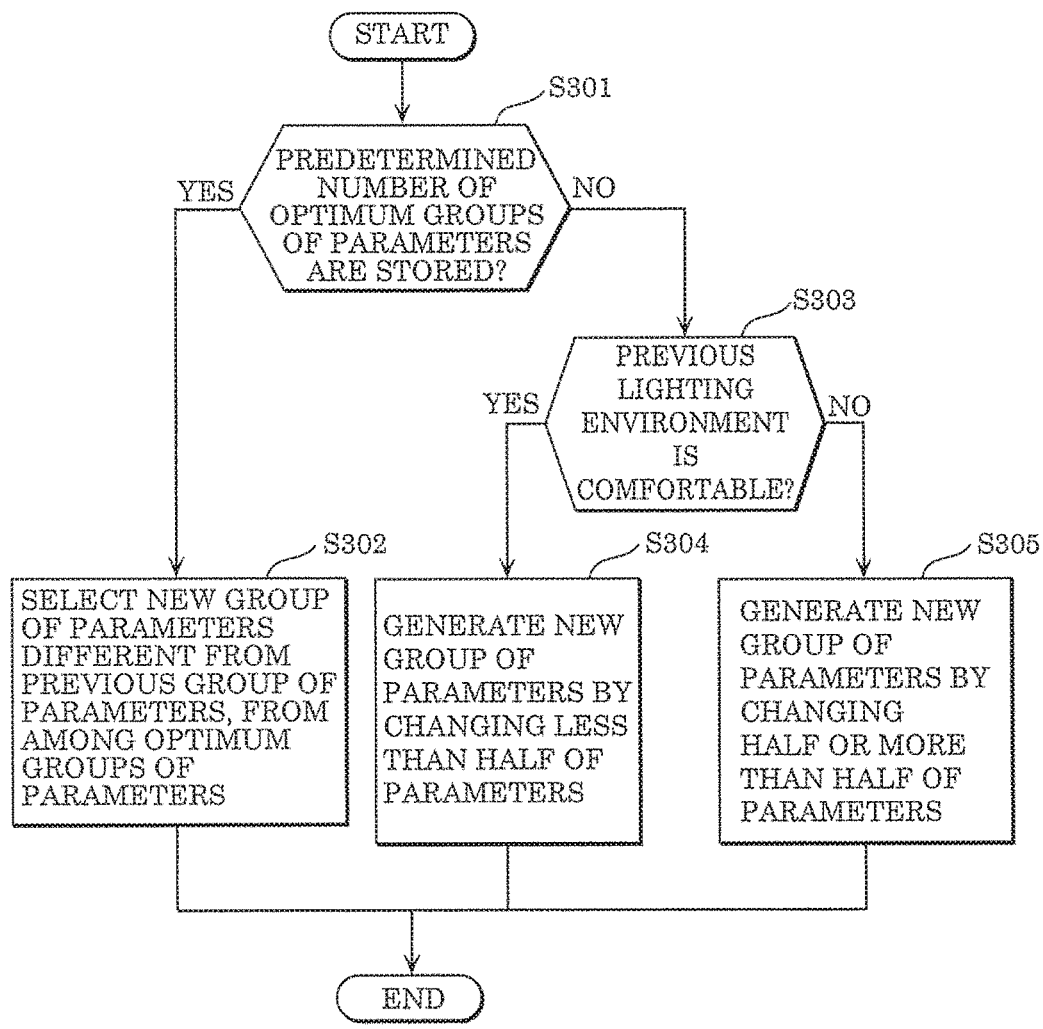
FIG. 9 is a flowchart which illustrates a processing procedure at the time when the lighting control system according to Embodiment 1 generates a new group of parameters after obtaining an evaluation from the user.

FIG. 9 is a flowchart which illustrates a processing procedure at the time when lighting control system 10 according to Embodiment 1 generates a new group of parameters after obtaining, from user 1, an evaluation (the degree of comfort) on an environment.

As illustrated in FIG. 9, controller 12, at the time of generating a new group of parameters, determines whether or not a predetermined number of optimum groups of parameters are stored in storage 14 (Step S301). Here, the predetermined number of groups of optimum parameters are not specifically limited. The predetermined number of optimum groups of parameters may be arbitrarily set, for example, may be set to 10, 20, or 50. When the predetermined number of optimum groups of parameters are stored in storage 14 (Yes in Step S301), controller 12 selects, as a new group of parameters, a group of parameters from among the optimum groups of parameters stored in storage 14 (Step S302). When controller 12 selects a new group of parameters from among the optimum groups of parameters stored in storage 14, controller 12 selects a new group of parameters from among the optimum groups of parameters such that the new group of parameters are different from the group of parameters which previously defined the environment.

On the other hand, in the case where the predetermined number of optimum groups of parameters are not stored in storage 14 (No in Step S301), controller 12, at the time of generating a new group of parameters, refers to the degree of comfort which indicates whether or not the previous environment is comfortable for user 1 (Step S303).

When the degree of comfort obtained by obtainer 11 indicates that the previous environment is comfortable for user 1 (Yes in Step S303), controller 12 generates a new group of parameters by changing less than a half of parameters among the parameters included in the group of parameters for implementing the previous environment (Step S304). On the other hand, when the degree of comfort obtained by obtainer 11 indicates that the previous environment is uncomfortable for user 1 (No in Step S303), controller 12 generates a new group of parameters by changing half or more than a half of parameters among the parameters included in the group of parameters for implementing the previous environment (Step S305). In other words, controller 12 changes, at the time of generating a new group of parameters, the parameters included in the group of parameters in such a manner that, a smaller number of parameters are changed when user 1 selects first option 221 (see FIG. 8A) which indicates a feeling of comfort than when user 1 selects second option 222 (see FIG. 8A) which indicates a feeling of discomfort.

FIG. 10 is a diagram which illustrates an example of groups of parameters selected from among a plurality of parameters, and the degree of comfort that user 1 feels about the environment implemented according to the groups of parameters. It should be noted that FIG. 10 is a diagram which illustrates an example of when controller 12 generates a group of parameters by selecting three parameters from among the parameters illustrated in FIG. 5.

First, it is assumed that controller 12 generates group of parameters A by selecting three parameters respectively indicating 5% as the initial amount of light (dimming rate), green as the light color, and 60 minutes before as the start time, as illustrated in FIG. 10. Light emitter 13 emits light in a mode according to group of parameters A at a predetermined time. In other words, light emitter 13 performs scene control. It is assumed here that user 1 determines that the environment implemented by group of parameters A is uncomfortable. In this case, controller 12 generates new group of parameters B, by changing the three parameters to parameters respectively indicating 50% as the initial amount of light, daylight white as the light color, and 15 minutes before as the start time.

Next, light emitter 13 emits light in a mode according to group of parameters B at a predetermined time. In other words, light emitter 13 performs scene control. Here, when user 1 determines that the environment implemented by group of parameters B is comfortable, controller 12 causes storage 14 to store group of parameters B as the optimum group of parameters. In addition, controller 12 generates new group of parameters C by changing only one parameter among the parameters included in group of parameters B. Controller 12 generates new group of parameters C by changing, for example, the parameter which is included in group of parameters B and indicates 15 minutes before as the start time to a parameter indicating 30 minutes before as the start time.

Next, light emitter 13 emits light in a mode according to group of parameters C at a predetermined time. In other words, light emitter 13 performs scene control. Here, when user 1 determines that the environment implemented by group of parameters C is comfortable, controller 12 causes storage 14 to store group of parameters C as the optimum group of parameters.

In this manner, controller 12 generate a new group of parameters, while adjusting, as appropriate, the number of parameters to be changed among the parameters included in the group of parameters, depending on whether or not the environment implemented by the group of parameters is comfortable for user 1.

It should be noted that when to generate a new group of parameters by controller 12 after obtaining, from user 1, the degree of comfort that is an evaluation on the environment is not specifically limited. Controller 12 may generate a new group of parameters in the step illustrated in FIG. 9 immediately after obtaining the degree of comfort from user 1, or may generate a new group of parameters according to the time information obtained from user 1, such as 30 minutes before the time indicated by the time information.

(Advantageous Effects, Etc.)

As described above, lighting control system 10 according to Embodiment 1 includes storage 14 in which a plurality of parameters are stored, and light emitter 13 which emits light in a predetermined mode according to parameters. Lighting control system 10 further includes controller 12 which selects at least two parameters from among the plurality of parameters stored in storage 14 and generates a group of parameter including the selected parameters, and obtainer 11 which obtains an instruction from user 1. Light emitter 13 emits light at a predetermined time in a mode according to the group of parameters generated by controller 12. In addition, when obtainer 11 obtains a degree of comfort selected from feeling options 223 or feeling options 231 each of which indicates feelings of user 1, controller 12 generates a new group of parameters in which one or more parameters among the parameters included in the group of parameters are changed according to the degree of comfort.

In this manner, controller 12 is capable of performing control for changing, according to a change in a feeling of user 1 which indicates whether or not a certain environment is comfortable, the environment into an environment suitable to a current preference of user 1. Furthermore, even in the case where user 1 selects an option indicating that a certain environment is comfortable, controller 12 also changes one or more parameters included in the group of parameters for implementing the environment. This prevents user 1 from being accustomed to or being bored by the environment which user 1 finds comfortable. Accordingly, with lighting control system 10, it is possible to perform scene control to provide a user with an environment which the user is likely to find comfortable.

In addition, when obtainer 11 obtains the degree of comfort, light emitter 13 may stop emitting light performed in the mode according to the group of parameters generated by controller 12.

In this manner, obtainer 11 is capable of more reliably obtaining, from user 1, information indicating whether or not the environment is comfortable for user 1.

In addition, feeling options 223 may include first option 221 indicating a positive feeling and second option 222 indicating a negative feeling. Furthermore, the number of parameters changed by controller 12 in generating the new group of parameters may be smaller when user 1 selects first option 221 than when user selects second option 222.

This enables controller 12 to easily select a parameter for implementing an environment which user 1 is highly likely to find comfortable.

In addition, when user 1 selects first option 221, controller 12 may cause storage 14 to store the group of parameters generated by controller 12 as an optimum group of parameters. Furthermore, in generating the new group of parameters when a predetermined number of optimum groups of parameters each being the optimum group of parameters are stored in storage 14, controller 12 may select a group of parameters from among the predetermined number of optimum groups of parameters stored in storage 14, and determine the selected group of parameters as the new group of parameters.

This enables controller 12 to easily select a parameter for implementing an environment which user 1 is more highly likely to find comfortable.

In addition, when user 1 selects second option 222, controller 12, for example, does not cause storage 14 to store the group of parameters as the optimum group of parameters.

In other words, in the case where a group of parameters which is used in an environment is a group of parameters stored in storage 14 as an optimum group of parameters as a result of user 1 selecting an option indicating that the environment is comfortable, controller 12 performs control for deleting the group of parameters which is used and stored in storage 14 from optimum groups of parameters when user 1 selects an option indicating that the environment is uncomfortable. This enables controller 12 to easily select a parameter for implementing an environment which user 1 is highly likely to find comfortable at present, even when a comfortable or uncomfortable feeling of user 1 for an environment changes.

In addition, the lighting control method according to Embodiment 1 includes: selecting two or more parameters from among a plurality of parameters to generate a group of parameters including the two or more parameters selected. In addition, the lighting control method according to Embodiment 1 further includes emitting light at a predetermined time in a mode according to the group of parameters, and obtaining a degree of comfort selected from among feeling options 223 and feeling options 231 each indicating a feeling of user 1. In addition, the lighting control method according to Embodiment 1 further includes generating a new group of parameters by changing, according to the degree of comfort, one or more parameters among the two or more parameters included in the group of parameters.

In this manner, with the lighting control method according to Embodiment 1, it is possible to perform control for changing, according to a change in the feeling of user 1 which indicates whether or not a certain environment is comfortable, the environment into an environment suitable to a current preference of user 1. Furthermore, even in the case where user 1 selects an option indicating that a certain environment is comfortable, one or more parameters included in the group of parameters for implementing the environment are changed. This prevents user 1 from being accustomed to or being bored by the environment which user 1 finds comfortable. Accordingly, it is possible to perform scene control to provide a user with an environment which the user is likely to find comfortable.

In addition, feeling option 223 may include first option 221 indicating a positive feeling and second option 222 indicating a negative feeling. In addition, in the generating, the number of parameters changed may be smaller when user 1 selects first option 221 than when user 1 selects second option 222.

In this manner, with the lighting control method according to Embodiment 1, it is possible to select a parameter for implementing an environment which user 1 is highly likely to find comfortable.

In addition, in the obtaining, when user 1 selects first option 221, the group of parameters generated in the selecting may be stored in storage 14 as an optimum group of parameters. In addition, in the generating, when a predetermined number of optimum groups of parameters each being the optimum group of parameters are stored in storage 14, a group of parameters is selected from among the predetermined number of optimum groups of parameters stored in storage 14, and the selected group of parameters is determined as the new group of parameters.

In this manner, with the lighting control method according to Embodiment 1, it is possible to easily select a parameter for implementing an environment which user 1 is more highly likely to find comfortable.

In addition, the steps included in the lighting control method according to the present disclosure may be implemented as a non-transitory computer-readable recording medium on which a program for causing the computer to execute the steps included in the lighting control method is recorded.

With this configuration, the lighting control method can be executed by the computer as a program that enables easily performing the scene control which user 1 find comfortable.

(Modification Example of Embodiment 1)

The following describes a lighting control system according to a modification example of Embodiment 1. As described above, with lighting control system 10 according to Embodiment 1, controller 12 generates a new group of parameters according to a degree of comfort which is obtained by obtainer 11 and indicates whether or not an environment is comfortable for user 1. With the lighting control system according to the modification example of Embodiment 1, a new group of parameters is generated according to the degree of comfort and a degree of awakening.

It should be noted that the lighting control system according to the modification example of Embodiment 1 has substantially the same functional configuration as the functional configuration of lighting control system 10 according to Embodiment 1. In other words, the lighting control system according to the modification example of Embodiment 1 functionally includes: obtainer 11; controller 12; light emitter 13; storage 14; and display 15.

In addition, in the description of the lighting control system according to the modification example of Embodiment 1, substantially similar to and substantially the same steps as lighting control system 10 according to Embodiment 1 are assigned with the same reference signs, and there are instances where redundant descriptions will be omitted or simplified.

(Processing Procedure of a Lighting Control System)

Figure 11:
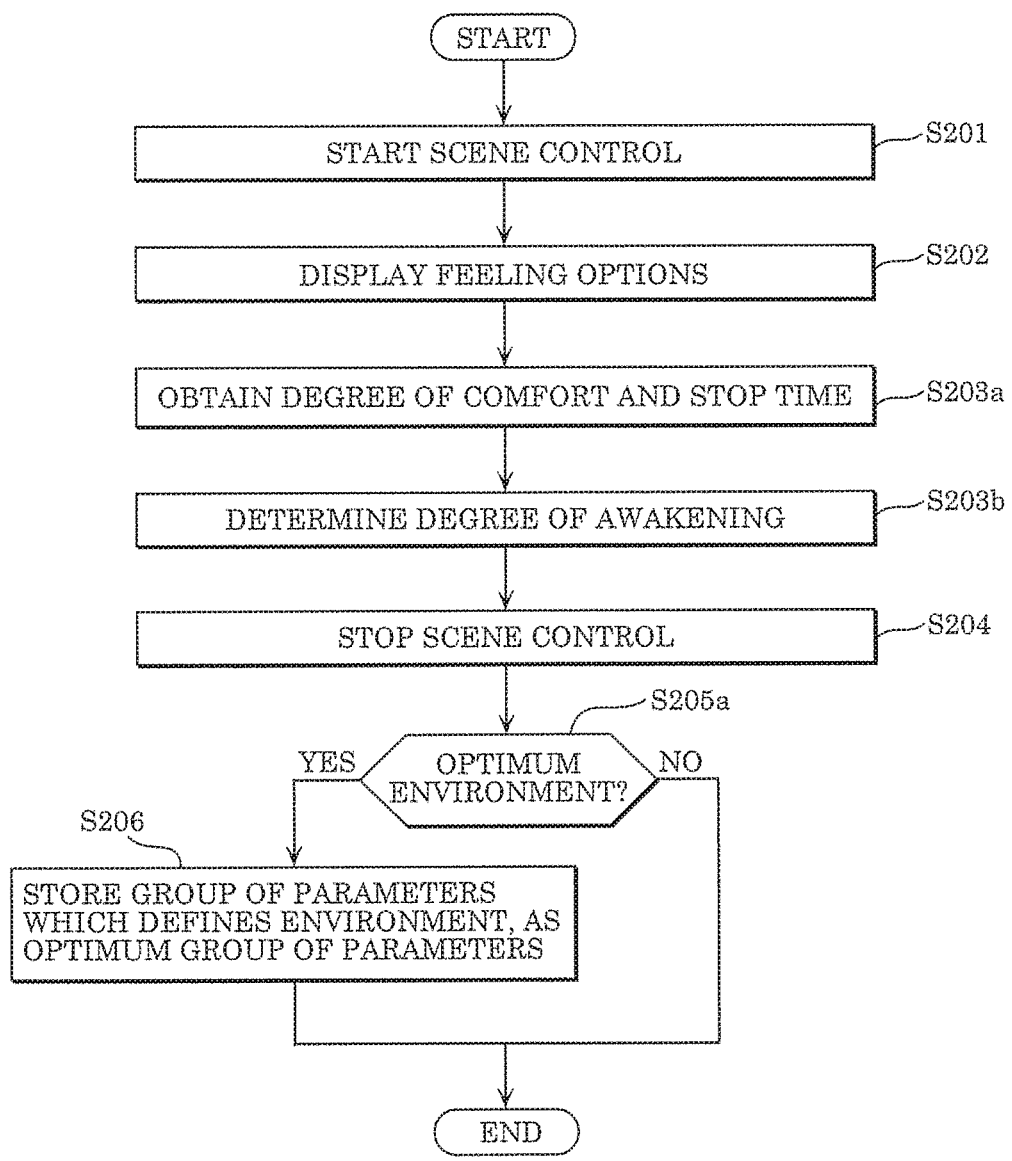
FIG. 11 is a flowchart which illustrates a processing procedure of the lighting control system according to a modification example of Embodiment 1, at the time of obtaining an evaluation including the degree of awakening from the user.

FIG. 11 is a flowchart which illustrates a processing procedure of the lighting control system according to the modification example of Embodiment 1, at the time of obtaining, from user 1, an evaluation including the degree of awakening.

First, controller 12 selects a plurality of parameters from among parameters 70 stored in storage 14, and generates a group of parameters including the selected parameters (see FIG. 3).

As illustrated in FIG. 11, light emitter 13 performs scene control at a time according to time information obtained by obtainer 11 from user 1, in a mode according to the group of parameters generated by controller 12 (Step S201).

Next, controller 12 performs control for causing display 15 to display selection image 220 including feeling options 223 for causing user 1 to select whether or not the environment is comfortable (Step S202). For example, controller 12 performs control for causing display 15 to display selection image 220 or selection image 230 (see FIG. 8A or FIG. 8B).

Obtainer 11 obtains, from user 1, a stop time and a degree of comfort which indicates whether or not the environment is comfortable (Step S203a). Here, the stop time is a period of time from when light emitter 13 starts performing of the scene control to when obtainer 11 obtains a stop instruction for stopping the scene control from user 1. For example, in the case where obtainer 11 obtains, from user 1, time information indicating that the set time is 6:00 AM, the stop time is 5 minutes when obtainer 11 obtains at 6:05 AM, from user 1, the stop instruction for stopping the scene control. In addition, for example, in the case where obtainer 11 obtains, from user 1, time information indicating that the set time is 6:00 AM, the stop time is 10 minutes when obtainer 11 obtains at 5:50 AM, from user 1, the stop instruction for stopping the scene control. In other words, the stop time is a difference between a set time and a stop time that is the time at which obtainer 11 obtains a stop instruction from user 1.

Controller 12 determines a degree of awakening according to a predetermined criterion for determination of a degree of awakening according to the stop time (Step S203b). Here, the degree of awakening is an index according to the above-described stop time. For example, in the case where obtainer 11 obtains, from user 1, time information indicating 6:00 AM as a set time, the degree of awakening is an index determined based on 5 minutes that is a stop time, when obtainer 11 obtains at 6:05 AM, from user 1, an instruction for stopping the scene control. The criterion for determination of a degree of awakening is not specifically limited. The degree of awakening may be determined as being appropriate when the stop time is less than or equal to one minute, when the stop time is less than or equal to 3 minutes, or when the stop time is less than or equal to 5 minutes. Controller 12 determines that the degree of awakening is not appropriate when, for example, the above-described criterion for determination of a degree of awakening is not satisfied.

Light emitter 13 stops performing of the scene control when obtainer 11 obtains the degree of comfort from user 1 (Step S204).

Next, controller 12 determines whether or not the environment is an optimum environment for user 1 (Step S205a). More specifically, controller 12 determines whether or not the environment is appropriate for user 1 on the basis of the degree of comfort of user 1 obtained by obtainer 11 and the degree of awakening determined by controller 12. For example, in the case where the degree of comfort of user 1 obtained by obtainer 11 is comfortable (positive feeling) and controller 12 determines that the degree of awakening is appropriate, controller 12 determines that the environment is an optimum environment. In the case where the degree of comfort of user 1 obtained by obtainer 11 is uncomfortable (negative feeling) or controller 12 determines that the degree of awakening is not appropriate, controller 12 determines that the environment is not an optimum environment.

When controller 12 determines that the environment is an optimum environment (Yes in Step S205a), controller 12 performs control for causing storage 14 to store, as an optimum group of parameters, the group of parameters which defines the environment (Step S206).

On the other hand, when controller 12 determines that the environment is not an optimum environment (No in Step S205a), controller 12 ends the processing without causing storage 14 to store the group of parameters which defines the environment.

Next, controller 12 generates a new group of parameters according to the degree of comfort and the degree of awakening. Specifically, although switching between the steps of generating a new group of parameters is carried out using the degree of comfort in Step S303 illustrated in FIG. 9 according to Embodiment 1, the degree of comfort and the degree of awakening are used for switching between the steps of generating a new group of parameters according to the modification example of Embodiment 1. More specifically, when controller 12 determines that the degree of comfort of user 1 obtained by obtainer 11 indicates that the environment is comfortable and the degree of awakening indicates that the degree of awakening is appropriate, the process proceeds from Step S303 to Step S304. When controller 12 determines that the degree of comfort of user 1 obtained by obtainer 11 indicates that the environment is uncomfortable or the degree of awakening indicates that the degree of awakening is not appropriate, the process proceeds from Step S303 to Step S305.

It should be noted that, in the lighting control system according to the modification example of Embodiment 1, Step S301, S302, S304, and S305 in the steps of generating a new group of parameters executed by controller 12 illustrated in FIG. 9 are substantially the same as those in lighting control system 10 according to Embodiment 1, and thus description will be omitted.

(Advantageous Effects, Etc.)

As described above, controller 12 of the lighting control system according to the modification example of Embodiment 1 measures a stop time which is a period of time from when light emitter 13 starts emitting light at the predetermined time in the mode according to the group of parameters to when obtainer 11 obtains a stop instruction for stopping the emitting light from user 1. Here, when user 1 selects first option 221 in the case where the stop time is less than or equal to a predetermined period of time, controller 12 causes storage 14 to store the group of parameters as the optimum group of parameters.

In this manner, in the case where user 1 finds the environment comfortable, controller 12 does not cause storage 14 to store, as an optimum group of parameters, the group of parameters which defines the environment unless a degree of awakening satisfies a predetermined criterion. In other words, even when user 1 finds an environment comfortable, controller 12 does not cause storage 14 to store, as an optimum group of parameters, the group of parameters which defines the environment unless user 1 awakens at the time set by user 1. For that reason, with a lighting control system according to the modification example of Embodiment 1, it is possible to readily implement scene control to provide user 1 with an environment which user 1 is likely to find comfortable and in which user 1 is able to wake up at a time set by user 1.

(Embodiment 2)

The following describes a lighting control system according to Embodiment 2. As described above, in lighting control system 10 according to Embodiment 1, light emitter 13 emits light in a mode according to a group of parameters generated by controller 12, thereby performing scene control. A lighting control system according to Embodiment 2 further includes an outputter which controls at least one of an image, a sound, a smell, air conditioning, and vibration in a predetermined mode, in addition to the configuration of lighting control system 10 according to Embodiment 1. The outputter controls, at a predetermined time, at least one of an image, a sound, a smell, air conditioning, and vibration, in a mode according to a group of parameters generated by a controller. In other words, the lighting control system according to Embodiment 2 implements an environment using light emitter 13 and the outputter.

In addition, in the lighting control system according to Embodiment 2, attribute information of user 1 is used when the controller generates a group of parameters which defines an environment.

It should be noted that, in the description of the lighting control system according to Embodiment 2, substantially the same configuration and steps as lighting control system 10 according to Embodiment 1 are assigned with the same reference signs, and there are instances where redundant descriptions will be omitted or simplified.

(Configuration of the Lighting Control System)

The following describes the lighting control system according to Embodiment 2 with reference to FIG. 12 to FIG. 16.

Figure 12:
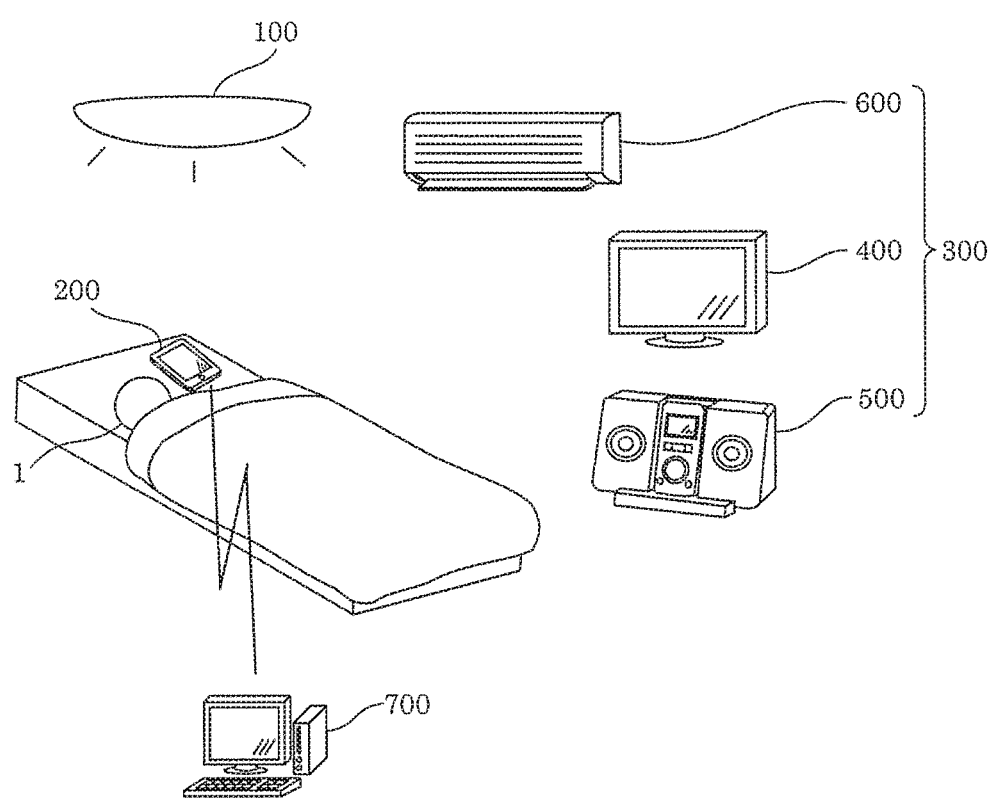
FIG. 12 is a diagram which illustrates a configuration of a lighting control system according to Embodiment 2.
Figure 13:
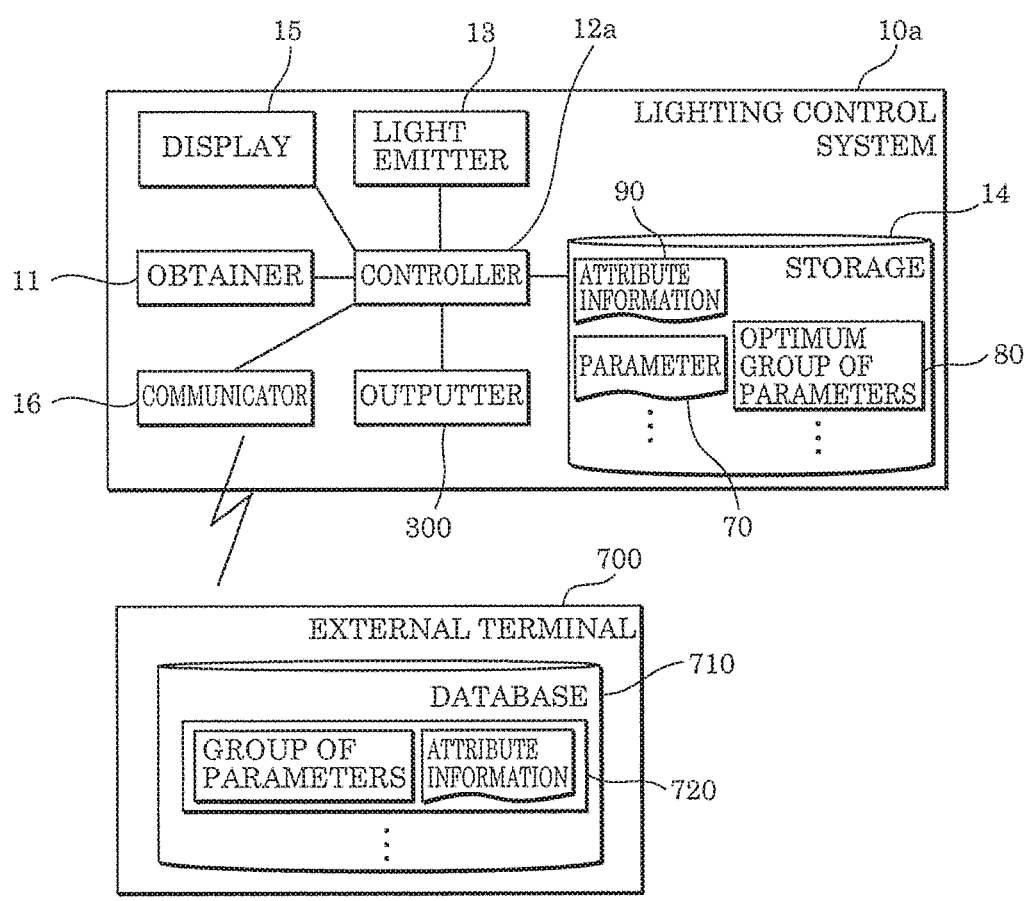
FIG. 13 is a block diagram which illustrates a functional configuration of the lighting system according to Embodiment 2.

FIG. 12 is a diagram which illustrates a configuration of the lighting control system according to Embodiment 2. FIG. 13 is a block diagram which illustrates a functional configuration of the lighting control system according to Embodiment 2.

As illustrated in FIG. 12, user 1 operates operation terminal 200 connected to lighting apparatus 100 and outputter 300 in such a manner that communication is allowed with one another, thereby transmitting an instruction to lighting apparatus 100 and outputter 300.

Lighting apparatus 100 emits light at a predetermined time in a predetermined mode according to the received instruction. Outputter 300 performs output at a predetermined time in a predetermined mode according to the received instruction. Outputter 300 is a control device which controls at least one of an image, a sound, a smell, air conditioning, and vibration, as described above.

In the case where outputter 300 controls an image, outputter 300 is, for example, monitor 400 which displays an image.

In the case where outputter 300 controls a sound, outputter 300 is, for example, speaker 500 which outputs music or the like.

In the case where outputter 300 controls a smell, outputter 300 is, for example, an aroma generator (not illustrated) which generates a smell in a space.

In the case where outputter 300 controls air conditioning, outputter 300 is, for example, air conditioner 600 which controls a temperature in a space.

In the case where outputter 300 controls vibration, outputter 300 is, for example, a vibration generator (not illustrated) for causing a bed, a pillow, etc., used by user 1 at a time of sleep to vibrate.

In lighting control system 10a according to Embodiment 2, scene control is performed in which an environment implemented by lighting apparatus 100 (lighting environment) and an environment implemented by outputter 300 (control environment) are combined. In other words, lighting control system 10a according to Embodiment 2 performs scene control including control on a lighting environment and control on a control environment.

It should be noted that the following describes the case where lighting control system 10a includes, as outputter 300, monitor 400, speaker 500, and air conditioner 600.

Monitor 400 is a display device which displays an image according to an instruction from controller 12a (see FIG. 13). Monitor 400 is, for example, a television set, a display, or the like.

Speaker 500 is a speaker which outputs a sound such as music according to an instruction from controller 12a. Speaker 500 is implemented by, for example, a speaker, an amplifier, or the like.

Air conditioner 600 is an air conditioner which controls a temperature, humidity, etc., in a space according to an instruction from controller 12a.

In addition, lighting control system 10a is connected to external terminal 700 in such a manner that communication is allowed with one another. For example, when controller 12a issues an instruction for causing speaker 500 to output predetermined music, controller 12a may obtain music stored in external terminal 700 and transmit the music to speaker 500. Speaker 500 may output the music received from controller 12a. External terminal 700 is a Web server, for example.

As illustrated in FIG. 13, lighting control system 10a functionally includes: obtainer 11; controller 12a; light emitter 13, storage 14, display 15, communicator 16, and outputter 300. In addition, lighting control system 10a is connected, via communicator 16, to external terminal 700 in such a manner that communication is allowed with one another.

Controller 12a is a processing unit which generates a group of parameters according to the instruction of user 1 obtained by obtainer 11. Controller 12a is, for example, a processor implemented by a CPU and a control program stored in storage 14. In addition, controller 12a may have a clock function such as an RTC.

Controller 12a selects two or more parameters from among a plurality of parameters 70 stored in storage 14. More specifically, controller 12a generates a group of parameters by selecting parameters to be used in scene control performed by light emitter 13 and outputter 300, from among parameters 70 stored in storage 14.

Figure 14:
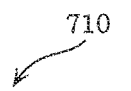
FIG. 14 is a diagram which illustrates an example of an attribute input image that is displayed when obtaining, from a user, attribute information of the user.

FIG. 14 is a diagram which illustrates an example of a plurality of parameters used for environment configuration.

For example, as illustrated in FIG. 14, parameters 70 which define a predetermined mode in which light emitter 13 emits light and outputter 300 performs output are stored in storage 14. More specifically, parameters which define a mode in which light emitter 13 controls a lighting environment and parameters which define a mode in which outputter 300 controls a control environment are stored in storage 14. For example, controller 12a generates a group of parameters by selecting a plurality of parameters from among the parameters illustrated in FIG. 14.

In addition, when obtainer 11 obtains, from user 1, attribute information 90 indicating an attribute of user 1, controller 12a performs control for causing storage 14 to store attribute information 90. Here, the attribute information is information for use in estimating a preference of user 1, and information indicating, for example, age, gender, nationality, hobby, etc., of user 1.

Figure 15:
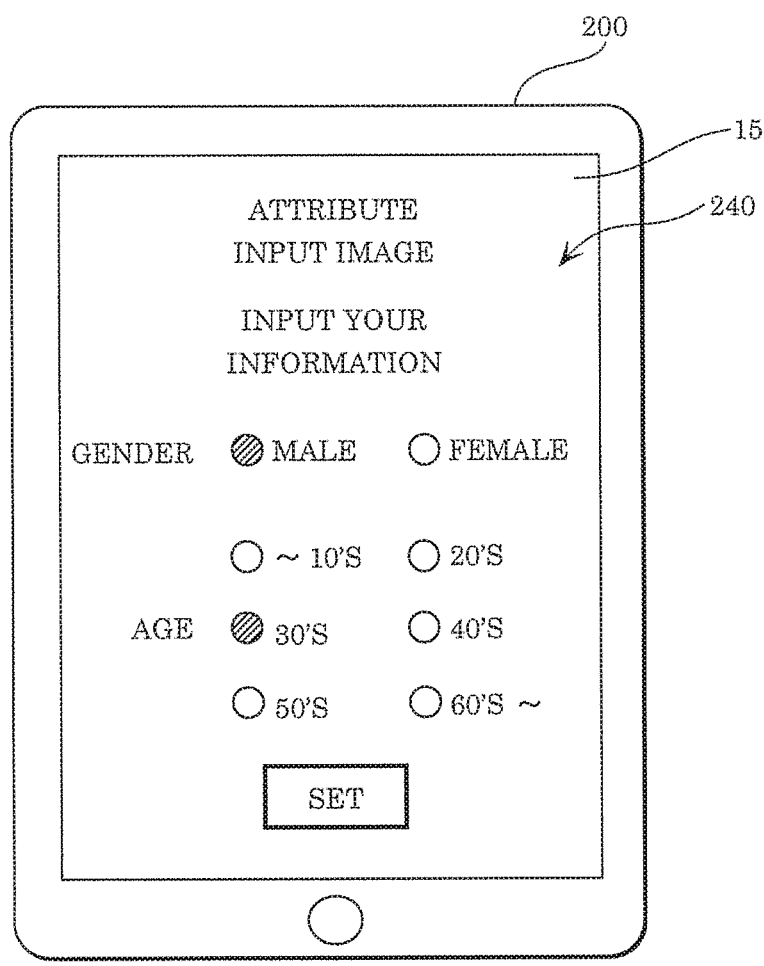
FIG. 15 is a diagram which illustrates an example of a plurality of parameters according to Embodiment 2.

FIG. 15 is a diagram which indicates an example of an attribute input image that is displayed when obtaining, from user 1, attribute information 90 of user 1.

Controller 12a performs control for causing display 15 to display attribute input image 240 so as to obtain, from user 1, attribute information 90 of user 1. User 1 inputs attribute information 90 of user 1 according to attribute input image 240 displayed on display 15, thereby allowing obtainer 11 to obtain attribute information 90 of user 1. Controller 12a performs control for causing storage 14 to store attribute information 90 obtained by obtainer 11.

In addition, at the time of generating a group of parameters, controller 12a generates a group of parameters according to attribute information 90. More specifically, controller 12a refers to an attribute-based optimum group of parameters stored in advance in database 710 included in external terminal 700. In the stored attribute-based optimum group of parameters, an optimum group of parameters and attribute information of a user different from user 1 of the lighting control system according to the present disclosure are associated with one another.

FIG. 16 is a diagram which illustrates an example of an attribute-based optimum group of parameters which is information of an optimum group of parameters stored in association with attribute information stored in external terminal 700.

As illustrated in FIG. 16, database 710 includes an optimum group of parameters which are classified by attribute information. For example, when the attribute information indicates "a male in his 30's", external terminal 700 stores in database 710, as an optimum group of parameters, information indicating: 50% as the initial amount of light; a daylight white as the light color; 30 minutes before as the start time, non as the music and the volume, 22 degrees Celsius as the temperature, and weather (for example, weather information for the day) as the image (image displayed on monitor 400). In addition, external terminal 700 extracts attribute information and environments (a lighting environment and a control environment) determined as being comfortable by a plurality of users of the lighting control system according to the present disclosure, and updates database 710. In this manner, external terminal 700 stores, in database 710, attribute-based optimum group of parameters 720 that is a group of parameters in which a rough preference for each attribute information is reflected.

Controller 12a obtains attribute-based optimum group of parameters 720 corresponding to attribute information that matches attribute information 90 of user 1, and generates a group of parameters. For example, when user 1 uses lighting control system 10a for the first time, controller 12a determines a group of parameters which controller 12a generates first as attribute-based optimum group of parameters 720 corresponding to attribute information that matches attribute information 90 of user 1.

It should be noted that, when controller 12a generates a new group of parameters (for example, Step S304 or Step S305 illustrated in FIG. 9), controller 12a may generate a new group of parameters by selecting one or more parameters from among the parameters included in attribute-based optimum group of parameters 720.

In addition, when obtainer 11 obtains the degree of comfort of feeling options 223 (see FIG. 8A), controller 12a stores, in storage 14, a group of parameters that define environments (a lighting environment and a control environment), attribute information 90 of user 1, and the degree of comfort in association with one another.

Communicator 16 is a communication interface for allowing communication between external terminal 700 and controller 12a. In other words, controller 12a performs communication with external terminal 700 by wire or by radio via communicator 16.

External terminal 700 is a Web server which stores database 710 of attribute-based optimum group of parameters 720.

It should be noted that, although it has been described that external terminal 700 stores database 710 of attribute-based optimum group of parameters 720, the present disclosure is not limited to this example, and database 710 may be stored in storage 14. In addition, when database 710 is stored in storage 14, controller 12a may communicate with external terminal 700 with an arbitrary timing and update the details of database 710.

In addition, it has been described that outputter 300 performs output in a predetermined mode according to a group of parameters generated by controller 12a. Here, outputter 300 may obtain the group of parameters, or controller 12a may provide outputter 300 an instruction for performing output in a predetermined mode according to the group of parameters. More specifically, controller 12a may generate a group of parameters, and cause outputter 300 to perform output in a mode according to the group of parameters. In other words, controller 12a may perform the scene control.

(Processing Procedure of the Lighting Control System)

Figure 17:
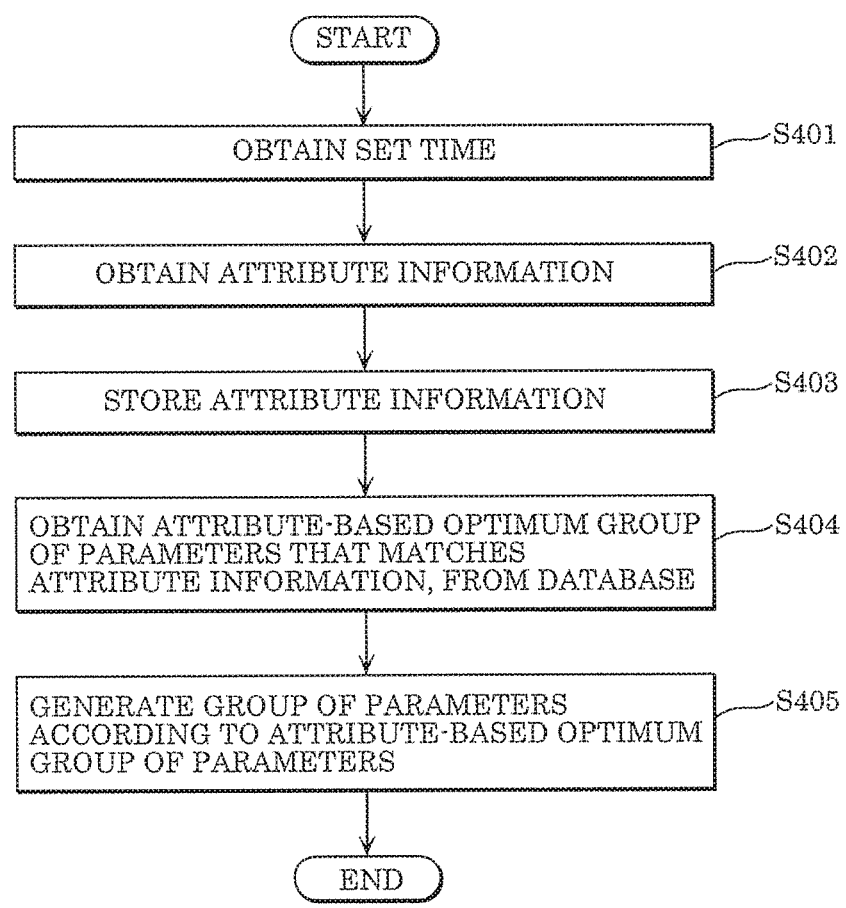
FIG. 17 is a flowchart which illustrates a processing procedure at the time of initial settings of the lighting control system according to Embodiment 2.
Figure 18:
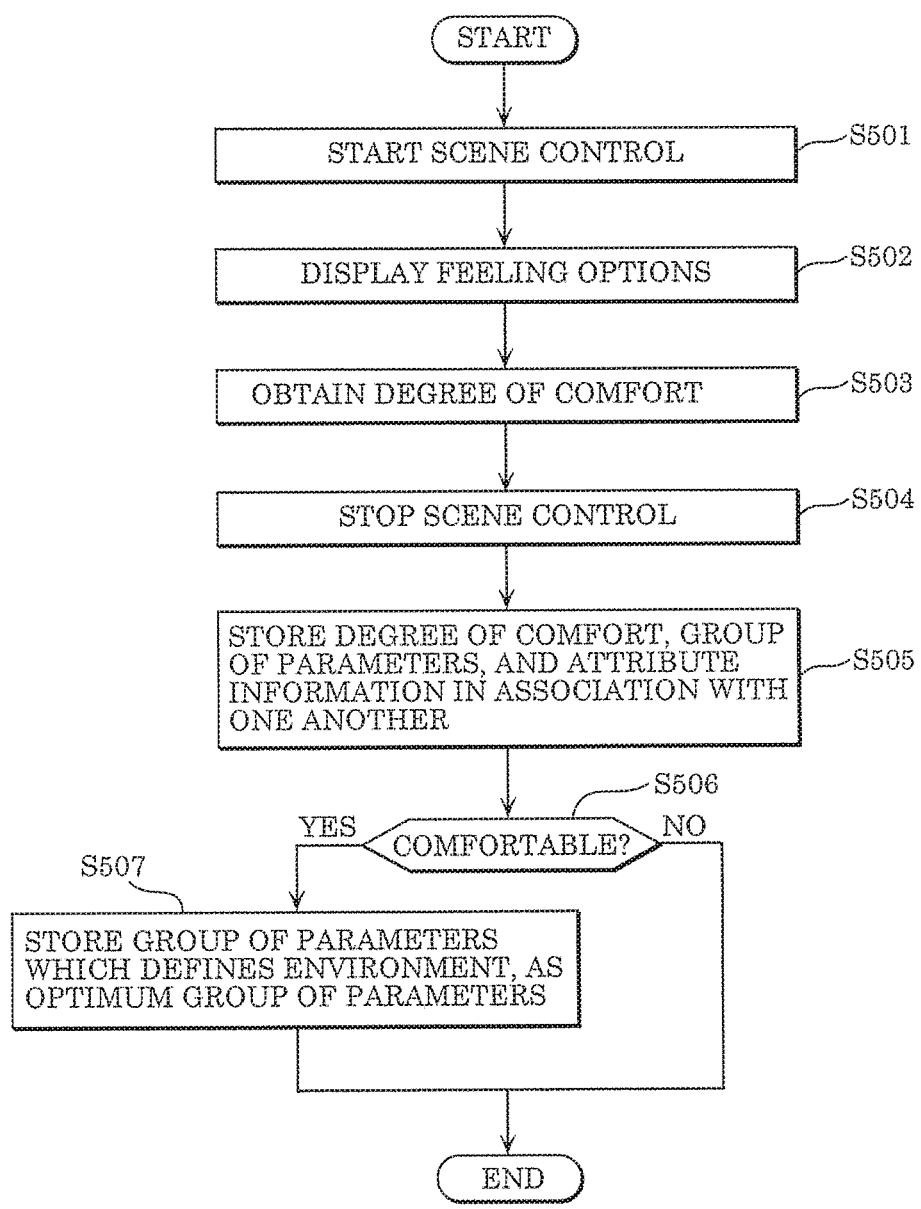
FIG. 18 is a flowchart which illustrates a processing procedure at the time of obtaining an evaluation on an environment from a user of the lighting control system according to Embodiment 2.

The following describes a processing procedure of scene control executed by lighting control system 10a according to Embodiment 2, with reference to FIG. 17 and FIG. 18.

FIG. 17 is a flowchart which illustrates a processing procedure at the time of initial settings of lighting control system 10a according to Embodiment 2.

As illustrated in FIG. 17, obtainer 11 obtains, from user 1, time information indicating a time at which light emitter 13 performs scene control (Step S401). More specifically, for example, controller 12a causes touch panel display 201 (an example of display 15) included by operation terminal 200 to display time settings image 210, as illustrated in FIG. 4. User 1 operates touch panel display 201, thereby setting a time at which light emitter 13 and outputter 300 perform scene control.

Next, obtainer 11 obtains attribute information 90 of user 1 from user 1 (Step S402). For example, as illustrated in FIG. 15, controller 12a performs control for causing display 15 to display attribute input image 240. User 1 inputs attribute information 90 of user 1 according to display 15, thereby allowing obtainer 11 to obtain attribute information 90 of user 1.

Next, controller 12a causes storage 14 to store the attribute information of user 1 (Step S403).

Next, controller 12a obtains attribute information 90 of user 1 and attribute-based optimum group of parameters 720 which matches the attribute information and is included in database 710 (Step S404).

Next, controller 12a generates a group of parameters according to attribute-based optimum group of parameters 720 (Step S405). Here, the group of parameters generated by controller 12a may be a group of parameters including parameters identical to the parameters of attribute-based optimum group of parameters 720, or may be a group of parameters including parameters part of which is different from the parameters of attribute-based optimum group of parameters 720.

FIG. 18 is a flowchart which illustrates a processing procedure at the time of obtaining an evaluation on the environment from user 1, of lighting control system 10a according to Embodiment 2.

As illustrated in FIG. 18, light emitter 13 and outputter 300 performs scene control at a time according to the time information obtained from user 1 so as to control light emission or an image, a sound, a temperature, etc., in a mode according to the group of parameters generated by controller 12a (Step S501).

Next, controller 12a performs control for causing display 15 to display selection image 220 including feeling options 223 for causing user 1 to select whether or not the environment is comfortable (Step S502). Obtainer 11 obtains, from user 1, a degree of comfort which indicates whether or not the environment is comfortable (Step S503).

Light emitter 13 and outputter 300 stop performing of the scene control when obtainer 11 obtains the degree of comfort from user 1 (Step S504). More specifically, when obtainer 11 obtains the degree of comfort from user 1, light emitter 13 stops emitting light in a predetermined mode according to the group of parameters. When obtainer 11 obtains the degree of comfort from user 1, outputter 300 stops controlling an image, a sound, a temperature, etc., in the predetermined mode according to the group of parameters.

Next, when obtainer 11 obtains the degree of comfort of feeling options 223 (see FIG. 8A), controller 12a stores, in storage 14, a group of parameters that define environments (a lighting environment and a control environment), attribute information 90 of user 1, and the degree of comfort in association with one another (Step S505).

Next, controller 12a determines whether or not the environment is comfortable for user 1 (a positive feeling) (Step S506).

When the degree of comfort obtained by obtainer 11 indicates that the environment is comfortable for user 1 (Yes in Step S506), controller 12a causes storage 14 to store the group of parameters which defines the environment as an optimum group of parameters (Step S507). More specifically, when user 1 selects first option 221 (see FIG. 8A), controller 12a causes storage 14 to store the group of parameters which defines the environment as the optimum group of parameters.

On the other hand, when the degree of comfort obtained by obtainer 11 indicates that the environment is uncomfortable (not comfortable) for user 1 (No in Step S506), controller 12a ends the processing without causing storage 14 to store the group of parameters which defines the environment.

It should be noted that, in Step S505, controller 12a may transmit information in which a group of parameters, attribute information 90, and a degree of comfort are associated with one another, to external terminal 700. In addition, external terminal 700 may update database 710 according to the information. Furthermore, when database 710 is stored in storage 14, controller 12a may update database 710 according to the information.

(Advantageous Effects, Etc.)

As described above, in lighting control system 10a according to Embodiment 2, controller 12a when obtainer 11 obtains, from user 1, attribute information indicating an attribute of user 1, obtainer 11 causes storage 14 to store the attribute information. In addition, in generating the new group of parameters, controller 12a selects a parameter to be changed, according to the attribute information.

For example, when user 1 uses lighting control system 10a for the first time, controller 12a determines a group of parameters which controller 12a generates first as attribute-based optimum group of parameters. In this manner, according to lighting control system 10a, it is possible to implement an environment which user 1 is highly likely to find comfortable even when the preference of user 1 is unknown.

In addition, when obtainer 11 obtains the degree of comfort, controller 12a may cause storage 14 to store the group of parameters generated by the controller, attribute information 90, and the degree of comfort, in association with one another.

In this manner, it is possible for user 1 to check an environment that has been implemented in the past, and the degree of comfort of the environment, with desired timing. More specifically, information in which a group of parameters, attribute information 90, and a degree of comfort which are stored and associated with one another is displayed on display 15, for example, thereby enabling user 1 to check the environment implemented in the past and the degree of comfort of the environment. Accordingly, user 1 can confirm, with desired timing, what kind of environment is comfortable for user 1. In addition, information in which a group of parameters, attribute information 90, and a degree of comfort are associated with one another may be transmitted to external terminal 700. External terminal 700 updates database 710 according to the information, thereby storing, in database 710, attribute-based optimum group of parameters 720 that is a group of parameters in which a rough preference for each attribute information is reflected.

In addition, lighting control system 10a may further include: outputter 300 which controls at least one of an image, a sound, a smell, air conditioning, and vibration, in a predetermined mode according to a parameter. Here, parameters 70 stored in storage 14 may include a parameter which defines the predetermined mode in which outputter 300 controls the at least one of the image, the sound, the smell, the air conditioning, and the vibration. In addition, outputter 300 may control, at a predetermined time, the at least one of the image, the sound, the smell, the air conditioning, and the vibration, in a mode according to the group of parameters generated by controller 12a.

In other words, lighting control system 10a controls not only lighting but also an image, a sound, a smell, air conditioning, vibration, etc., thereby making it possible to implement an environment which user 1 is likely to find comfortable.

(Other Embodiments)

Although the lighting control system and the like according to the embodiments have been described thus far, the present disclosure is not limited to the above-described embodiments.

The lighting control system described in the embodiments is one example. For example, it has been described that, when the degree of comfort obtained by the obtainer indicates that an environment is uncomfortable (not comfortable) for a user (for example, No in Step S506 is FIG. 18), the controller ends the processing without causing the storage to store the group of parameters which defines the environment. However, when the degree of comfort obtained by the obtainer indicates that the environment is uncomfortable for the user, the controller may cause the storage to store the group of parameters that defines the environment without determining the group of parameters as an optimum group of parameters. For example, the controller may cause the storage to store the group of parameters as a group of uncomfortable parameters. When the controller generates a new group of parameters, the controller may generate a group of parameters which does not match the group of uncomfortable parameters. In this manner, the lighting control system is capable of implementing an environment which user 1 is highly likely to find comfortable.

In addition, the lighting control system may include the above-described aroma generator which generates a smell in a space, or the above-described vibration generator for causing a bed, pillow, etc., used by a user at a time of sleep to vibrate.

For example, a parameter for causing the aroma generator and the vibration generator to operate in a predetermined mode may be included as a parameter stored in storage 14.

For example, storage 14 may store a parameter which indicates a type of a smell such as citrus aroma, herbal aroma, spice aroma, etc., as a parameter for causing the aroma generator to operate in a predetermined mode.

In addition, storage 14 may store a parameter which indicates a magnitude of vibration, a frequency of vibration, an operation mode (continuously or intermittently), etc., as a parameter for causing the vibration generator to operate in a predetermined mode.

In addition, the present disclosure may be implemented as a program for causing a computer to execute steps performed by the lighting control system. Alternatively, the present disclosure may be implemented as a non-transitory computer-readable recording medium such as a compact disc read only memory (CD-ROM) on which the programs are recorded. In addition, the present disclosure may be implemented as information, data, or a signal which indicates the program. Such a program, information, data, and a signal may be distributed via a communication network such as the Internet.

Although the lighting control system and the like according to one or plural aspects have been described thus far based on the embodiments, the present disclosure is not limited to the embodiments. Other forms in which various modifications apparent to those skilled in the art are applied to the embodiments, or forms structured by combining structural components of different aspects of the embodiments may be included within the scope of the one or plural aspects, unless such changes and modifications depart from the scope of the present disclosure.

While the foregoing has described one or more embodiments and/or examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting control system, comprising:
a storage which stores a plurality of parameters;
a light emitter which emits light in a predetermined mode according to the plurality of parameters;
a controller which selects two or more parameters from among the plurality of parameters stored in the storage to generate a group of parameters including the two or more parameters selected; and
an obtainer which obtains an instruction from a user, wherein:
the light emitter emits light at a predetermined time in a mode according to the group of parameters generated by the controller,
when the obtainer obtains a degree of comfort selected from among feeling options each indicating a feeling of the user, the controller generates a new group of parameters by changing, according to the degree of comfort, one or more parameters among the two or more parameters included in the group of parameters,
the feeling options include a first option indicating a positive feeling and a second option indicating a negative feeling, and
the number of parameters changed by the controller in generating the new group of parameters is smaller when the user selects the first option than when the user selects the second option.

2. The lighting control system according to claim 1, wherein
when the obtainer obtains the degree of comfort, the light emitter stops emitting light performed in the mode according to the group of parameters generated by the controller.

3. The lighting control system according to claim 1, wherein
the controller:
when the user selects the first option, causes the storage to store the group of parameters generated by the controller as an optimum group of parameters; and
in generating the new group of parameters when a predetermined number of optimum groups of parameters each being the optimum group of parameters are stored in the storage, selects a group of parameters from among the predetermined number of optimum groups of parameters stored in the storage, and determines the selected group of parameters as the new group of parameters.

4. The lighting control system according to claim 3, wherein
the controller,
when the user selects the second option, does not cause the storage to store the group of parameters as the optimum group of parameters.

5. The lighting control system according to claim 3, wherein
the controller:
measures a stop time which is a period of time from when the light emitter starts emitting light at the predetermined time in the mode according to the group of parameters to when the obtainer obtains a stop instruction for stopping the emitting light from the user; and when the user selects the first option in the case where the stop time is less than or equal to a predetermined period of time, causes the storage to store the group of parameters as the optimum group of parameters.

6. The lighting control system according to claim 3, wherein
the controller:
when the obtainer obtains, from the user, attribute information indicating an attribute of the user, the obtainer causes the storage to store the attribute information; and
in generating the new group of parameters, selects a parameter to be changed, according to the attribute information.

7. The lighting control system according to claim 6, wherein
when the obtainer obtains the degree of comfort, the controller causes the storage to store the group of parameters generated by the controller, the attribute information, and the degree of comfort, in association with one another.

8. The lighting control system according to claim 1, further comprising:
an outputter which controls at least one of an image, a sound, a smell, air conditioning, and vibration, in a predetermined mode according to a parameter, wherein
the plurality of parameters include a parameter which defines the predetermined mode in which the outputter controls the at least one of the image, the sound, the smell, the air conditioning, and the vibration, and
the outputter controls, at a predetermined time, the at least one of the image, the sound, the smell, the air conditioning, and the vibration, in a mode according to the group of parameters generated by the controller.

9. A lighting control method, comprising:
selecting two or more parameters from among a plurality of parameters to generate a group of parameters including the two or more parameters selected;
emitting light at a predetermined time in a mode according to the group of parameters;
obtaining a degree of comfort selected from among feeling options each indicating a feeling of a user; and
generating a new group of parameters by changing, according to the degree of comfort, one or more parameters among the two or more parameters included in the group of parameters, wherein:
the feeling options include a first option indicating a positive feeling and a second option indicating a negative feeling, and
in the generating, the number of parameters changed is smaller when the user selects the first option than when the user selects the second option.

10. The lighting control method according to claim 9, wherein
in the obtaining, when the user selects the first option, the group of parameters generated in the selecting is stored in a storage as an optimum group of parameters.

11. The lighting control method according to claim 10, wherein
in the generating, when a predetermined number of optimum groups of parameters each being the optimum group of parameters are stored in the storage, a group of parameters is selected from among the predetermined number of optimum groups of parameters stored in the storage, and the selected group of parameters is determined as the new group of parameters.

12. The lighting control method according to claim 10, wherein
in the obtaining, when the user selects the second option, the group of parameters generated in the selecting is not stored in the storage as the optimum group of parameters.

13. The lighting control method according to claim 10, further comprising:
measuring a stop time which is a period of time from when the emitting light at the predetermined time in the mode according to the group of parameters is started to when a stop instruction for stopping the emitting light is obtained from the user, wherein
in the obtaining, when the user selects the first option in the case where the stop time measured in the measuring is less than or equal to a predetermined period of time, the group of parameters is stored in the storage as the optimum group of parameters.

14. The lighting control method according to claim 10, further comprising:
when attribute information indicating an attribute of the user is obtained from the user, causing the storage to store the attribute information, wherein
in at least one of the selecting and the generating, a parameter to be changed is selected according to the attribute information.

15. The lighting control method according to claim 14, wherein
in the obtaining, when the degree of comfort is obtained, the group of parameters generated in the selecting, the attribute information, and the degree of comfort obtained in the obtaining are stored in the storage in association with one another.

16. The lighting control method according to claim 9, further comprising:
controlling at least one of an image, a sound, a smell, air conditioning, and vibration, in a predetermined mode according to a parameter, wherein
the plurality of parameters include a parameter which defines the predetermined mode in which the at least one of the image, the sound, the smell, the air conditioning, and the vibration are controlled in the controlling, and
in the controlling, the at least one of the image, the sound, the smell, the air conditioning, and the vibration are controlled at a predetermined time in a mode according to the group of parameters generated in the selecting.

17. A non-transitory computer-readable recording medium for use in a computer, the recording medium having a computer program recorded thereon for causing the computer to execute the lighting control method according to claim 9.

* * * * *